(12) United States Patent
Honda et al.

(10) Patent No.: US 10,494,693 B2
(45) Date of Patent: Dec. 3, 2019

(54) HIGH-STRENGTH STEEL SHEET AND METHOD FOR PRODUCING THE SAME

(71) Applicant: JFE STEEL CORPORATION, Tokyo (JP)

(72) Inventors: Yuma Honda, Fukuyama (JP); Yoshimasa Funakawa, Chiba (JP); Kozo Harada, Bekasi (ID)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 15/559,576

(22) PCT Filed: Mar. 22, 2016

(86) PCT No.: PCT/JP2016/001651
§ 371 (c)(1),
(2) Date: Sep. 19, 2017

(87) PCT Pub. No.: WO2016/152148
PCT Pub. Date: Sep. 29, 2016

(65) Prior Publication Data
US 2018/0044753 A1    Feb. 15, 2018

(30) Foreign Application Priority Data

Mar. 25, 2015  (JP) ................. 2015-062043

(51) Int. Cl.
| | |
|---|---|
| *C21D 6/00* | (2006.01) |
| *C21D 9/46* | (2006.01) |
| *C21D 8/02* | (2006.01) |
| *C22C 38/48* | (2006.01) |
| *C22C 38/16* | (2006.01) |
| *C22C 38/12* | (2006.01) |

(Continued)

(52) U.S. Cl.
CPC .............. *C21D 9/46* (2013.01); *B32B 15/013* (2013.01); *B32B 15/04* (2013.01); *B32B 15/043* (2013.01); *B32B 15/18* (2013.01); *C21D 6/004* (2013.01); *C21D 6/005* (2013.01); *C21D 6/008* (2013.01); *C21D 8/0205* (2013.01); *C21D 8/0273* (2013.01); *C21D 8/0278* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/26* (2013.01); *C22C 38/48* (2013.01); *C22C 38/54* (2013.01); *C23C 2/02* (2013.01); *C23C 2/06* (2013.01); *C23C 2/28* (2013.01); *C23C 2/40* (2013.01); *C23C 28/025* (2013.01); *C23C 30/00* (2013.01); *C23C 30/005* (2013.01); *C21D 8/0226* (2013.01); *C21D 8/0236* (2013.01); *C21D 2211/005* (2013.01); *C21D 2211/009* (2013.01); *Y10T 428/12792* (2015.01); *Y10T 428/12958* (2015.01); *Y10T 428/12972* (2015.01)

(58) Field of Classification Search
CPC ...... C21D 9/46; C21D 8/0236; C21D 8/0273; C21D 8/0278; C21D 2211/005; C21D 2211/009; C21D 8/0205; C21D 8/0226; C21D 6/008; C21D 6/005; C21D 6/004; C22C 38/18; C22C 38/12; C22C 38/54; C22C 38/48; C22C 38/001; C22C 38/002; C22C 38/02; C22C 38/04; C22C 38/06; C22C 38/16; C22C 38/00; C22C 38/14; C22C 38/20; C22C 38/22; C22C 38/26; C23C 2/02; C23C 2/06; C23C 2/28; C23C 2/40; C23C 28/025; C23C 30/00; C23C 30/005; B32B 15/013; B32B 15/04; B32B 15/043; B32B 15/18; Y10T 428/12792; Y10T 428/12958; Y10T 428/12972
See application file for complete search history.

(56) References Cited

U.S. PATENT DOCUMENTS

2014/0242415 A1* 8/2014 Azuma ................ C23C 2/06
                                                    428/659

FOREIGN PATENT DOCUMENTS

| CN | 1051764 A | 5/1991 |
|---|---|---|
| CN | 103003460 A | 3/2013 |

(Continued)

OTHER PUBLICATIONS

Machine Translation, Shigehiro et al., JP 2012-031458, Feb. 2012.*

(Continued)

*Primary Examiner* — Michael E. La Villa
(74) *Attorney, Agent, or Firm* — Oliff PLC

(57) ABSTRACT

A high-strength steel sheet having a high yield ratio and a reduced difference in strength between the center and edges of the steel sheet in the width direction. The high-strength steel sheet includes a composition containing, by mass, C: 0.02% or more and less than 0.10%, Si: less than 0.10%, Mn: less than 1.0%, P: 0.10% or less, S: 0.020% or less, Al: 0.01% or more and 0.10% or less, N: 0.010% or less, Nb: 0.005% or more and less than 0.070%, and the balance being Fe and inevitable impurities. Additionally, the steel sheet has a microstructure including, by area, ferrite: 90% or more, pearlite: 0% to 10%, and the total of martensite, retained austenite, and cementite: 0% to 3%. The average crystal grain diameter $d_C$ of the ferrite at the center of the steel sheet in the width direction is 15.0 μm or less.

14 Claims, No Drawings

(51) Int. Cl.
*C22C 38/06* (2006.01)
*C22C 38/02* (2006.01)
*C22C 38/00* (2006.01)
*C22C 38/54* (2006.01)
*C22C 38/04* (2006.01)
*B32B 15/01* (2006.01)
*C23C 2/40* (2006.01)
*C23C 2/28* (2006.01)
*C22C 38/26* (2006.01)
*C23C 30/00* (2006.01)
*C22C 38/20* (2006.01)
*C23C 28/02* (2006.01)
*C22C 38/14* (2006.01)
*C22C 38/22* (2006.01)
*B32B 15/04* (2006.01)
*B32B 15/18* (2006.01)
*C22C 38/18* (2006.01)
*C23C 2/02* (2006.01)
*C23C 2/06* (2006.01)

(56) References Cited

FOREIGN PATENT DOCUMENTS

| | | | |
|---|---|---|---|
| CN | 103339280 | A | 10/2013 |
| CN | 103842538 | A | 6/2014 |
| EP | 2594656 | A1 | 5/2013 |
| EP | 2671964 | A1 | 12/2013 |
| EP | 2 752 500 | A1 | 7/2014 |
| EP | 2 762 580 | A1 | 8/2014 |
| EP | 2762584 | A1 | 8/2014 |
| EP | 2 799 562 | A1 | 11/2014 |
| EP | 2 808 413 | A1 | 12/2014 |
| JP | H04350 | A | 1/1992 |
| JP | 2005-226081 | A | 8/2005 |
| JP | 2006/307281 | A | 11/2006 |
| JP | 4740099 | B2 | 8/2011 |
| JP | 2012-031458 | A | 2/2012 |
| JP | 4995109 | B2 | 8/2012 |
| KR | 10-2002-0036838 | A | 5/2002 |
| KR | 10-2010-0076441 | A | 7/2010 |

OTHER PUBLICATIONS

Nov. 17, 2017 Search Report issued in European Patent Application No. 16768054.5.
Jun. 14, 2016 International Search Report issued in International Patent Application No. PCT/JP2016/001651.
Jun. 5, 2018 Office Action issued in Chinese Patent Application No. 201680018071.1.
Jan. 22, 2019 Office Action issued in Chinese Patent Application No. 201680018071.1.
Nov. 9, 2018 Office Action issued in Korean Patent Application No. 10-2017-7027030.
Jun. 13, 2019 Office Action issued in Chinese Patent Application No. 201680018071.1.

* cited by examiner

HIGH-STRENGTH STEEL SHEET AND METHOD FOR PRODUCING THE SAME

TECHNICAL FIELD

The present disclosure relates to a high-strength steel sheet used as a material for automotive components or the like and a method for producing the high-strength steel sheet.

BACKGROUND ART

High-strength steel sheets have been commonly used as a material for automotive members, for example, in order to reduce the weights of the members. For example, frame members and crash-resistant members are required to be resistant to deformation at the time of impact in order to ensure the safety of vehicle occupants. Accordingly, a steel sheet used as a material for these members is required to have a high yield ratio. In order to consistently perform press forming of the steel sheet into a shape without the occurrence of cracking, the steel sheet is also required to have a reduced difference in tensile strength between the center and edges of the steel sheet in the width direction. There have been disclosed various steel sheets and techniques for producing the steel sheets in response to the yield ratio requirement.

Patent Literature 1 discloses a high-strength steel sheet having excellent paint-baking hardenability, the steel sheet containing Nb and Ti at a content of 0.01% or more in total and including a main phase that is ferrite having a recrystallization ratio of 80% or more, and a method for producing the high-strength steel sheet. Patent Literature 2 discloses a high-strength steel sheet having excellent collision resistance, the high-strength steel sheet having a microstructure including 20% to 50% unrecrystallized ferrite, and a method for producing the high-strength steel sheet.

CITATION LIST

Patent Literature

PTL 1: Japanese Patent No. 4740099
PTL 2: Japanese Patent No. 4995109

SUMMARY

Technical Problem

In the techniques described in Patent Literature 1 and Patent Literature 2, the coiling temperature in the width direction of the steel sheet subsequent to hot rolling is not adequately controlled. This may degrade the uniformity in the diameter of ferrite grains in the width direction of the steel sheet. Therefore, it is considered that the techniques described in Patent Literature 1 and Patent Literature 2 do not enable production of a high-strength steel sheet having a reduced difference in tensile strength between the center and edges of the steel sheet in the width direction. In addition, when unrecrystallized ferrite is formed as a part of the microstructure subsequent to hot rolling as in Patent Literature 2, producing a high-strength steel sheet having a reduced difference in tensile strength between the center and edges of the steel sheet in the width direction requires strict control of the temperature of the steel sheet in the width direction during annealing. Thus, it is substantially impossible to commercialize a steel sheet having a reduced difference in strength in the width direction by applying the invention described in Patent Literature 2.

In view of the above circumstances, the present disclosure was made in order to address the issues. It is an object of the present disclosure to provide a high-strength steel sheet having a high yield ratio and a reduced difference in strength between the center and edges of the steel sheet in the width direction.

Solution to Problem

The inventors of the present disclosure conducted extensive studies in order to address the issues and, as a result, found that it is important for addressing the above issues to obtain a microstructure primarily composed of ferrite in which the average diameter of ferrite crystal grains is reduced to a specific diameter or less and the difference in the average diameter of ferrite crystal grains between the center and edges of the steel sheet in the width direction is reduced. It was also found that it is effective for obtaining the desired microstructure to adjust the steel composition to be a predetermined composition and control the temperature at which the hot-rolled steel sheet is coiled to fall within an appropriate range.

Exemplary embodiments of the present disclosure are discussed below.

[1] A high-strength steel sheet including a composition containing, by mass, C: 0.02% or more and less than 0.10%, Si: less than 0.10%, Mn: less than 1.0%, P: 0.10% or less, S: 0.020% or less, Al: 0.01% or more and 0.10% or less, N: 0.010% or less, Nb: 0.005% or more and less than 0.070%, and the balance being Fe and inevitable impurities, and a microstructure including, by area, ferrite: 90% or more, pearlite: 0% to 10%, and the total of martensite, retained austenite, and cementite: 0% to 3%, wherein an average crystal grain diameter do of the ferrite at the center of the steel sheet in the width direction is 15.0 µm or less, and wherein a difference between an average crystal grain diameter $d_E$ of the ferrite at a position 100 mm from an edge of the steel sheet in the width direction toward the center of the steel sheet and the average crystal grain diameter do is 5.0 µm or less.

[2] The high-strength steel sheet described in [1], wherein the composition further contains one or more elements selected from, by mass, Cr: 0.3% or less, Mo: 0.3% or less, B: 0.005% or less, Cu: 0.3% or less, and Ni: 0.3% or less.

[3] The high-strength steel sheet described in [1] or [2], provided with a hot-dip galvanizing layer disposed on a surface of the high-strength steel sheet.

[4] The high-strength steel sheet described in [3], wherein the hot-dip galvanizing layer is a galvannealed layer.

[5] A method for producing a high-strength steel sheet, the method including hot-rolling a slab having the composition described in [1] or [2], coiling the resulting hot-rolled steel sheet such that a temperature of the hot-rolled steel sheet at the center of the steel sheet in the width direction is 500° C. to 650° C. and a difference between the temperature of the hot-rolled steel sheet at the center of the steel sheet in the width direction and a temperature of the hot-rolled steel sheet at the position 100 mm from an edge of the steel sheet in the width direction toward the center of the steel sheet in the width direction is 50° C. or less during coiling, cold-rolling the coiled hot-rolled steel sheet, and annealing the resulting cold-rolled steel sheet in a continuous annealing furnace.

[6] The method for producing a high-strength steel sheet described in [5], the method further including, subsequent to annealing, performing a hot-dip galvanizing on a surface of the high-strength steel sheet.

[7] The method for producing a high-strength steel sheet described in [6], the method further including subjecting the hot-dip galvanizing layer to an alloying treatment.

Advantageous Effects

According to the present disclosure, adequate control of the steel composition and the production conditions, such as conditions under which coiling is performed subsequent to hot rolling, can reduce the difference in tensile strength between the center and edges of the steel sheet in the width direction while maintaining the high yield ratio required by a material for automotive members.

According to the present disclosure, furthermore, it is possible to consistently produce the high-strength steel sheet. This enables further reduction in the weights of vehicles and a reduction in the amount of yield loss caused due to press cracking. The present disclosure is considerably valuable in the automotive industry and the steelmaking industry.

DESCRIPTION OF EMBODIMENTS

An embodiment of the present disclosure is described below. The present disclosure is not limited by the following embodiment. When referring to the content of a constituent in the following description, "%" refers to "% by mass".

It is an object of the present disclosure to produce a high-strength steel sheet having a tensile strength of 330 MPa or more and less than 500 MPa, the high-strength steel sheet having a high yield ratio of 0.70 or more and a reduced difference in tensile strength between the center and edges of the steel sheet in the width direction, which is 20 MPa or less. In order to produce such a high-strength steel sheet, it is effective that the composition of the steel sheet contain 0.005% or more Nb; the microstructure of the steel sheet be composed of ferrite phase only or be primarily composed of ferrite and include, in addition to ferrite, one or more selected from pearlite, martensite, retained austenite, and cementite; the average diameter of ferrite crystal grains at the center of the steel sheet in the width direction be 15.0 μm or less; and the difference in the average diameter of ferrite crystal grains between the center and edges of the steel sheet in the width direction be 5.0 μm or less.

In order to achieve the desired average diameter of ferrite crystal grains, it is important to control the temperature at which the hot-rolled steel sheet is coiled to be 500° C. to 650° C. and reduce the variation in the temperature of the steel sheet in the width direction during coiling. Specifically, it is important to reduce the difference in temperature between the center and edges of the steel sheet in the width direction to 50° C. or less. This may enable fine particles of Nb carbide to uniformly precipitate while cooling is performed subsequent to coiling after hot-rolling and, as a result, reduce the variation in the average diameter of ferrite crystal grains formed by annealing between the center and edges of the steel sheet in the width direction.

The yield strength and tensile strength of the steel sheet are determined by taking a JIS No. 5 tensile test specimen from the steel sheet at a position at which the center of the parallel portion of the specimen coincides with the center of the steel sheet in the width direction or with a position 100 mm from an edge of the steel sheet in the width direction toward the center of the steel sheet such that the tensile direction of the specimen is perpendicular to the rolling direction and subjecting the specimen to a tensile test conforming to JIS Z 2241.

The high-strength steel sheet according to the present disclosure is described in the order of composition and microstructure.

(1) Composition

The composition of the high-strength steel sheet according to the present disclosure contains, by mass, C: 0.02% or more and less than 0.10%, Si: less than 0.10%, Mn: less than 1.0%, P: 0.10% or less, S: 0.020% or less, Al: 0.01% or more and 0.10% or less, N: 0.010% or less, Nb: 0.005% or more and less than 0.070%, and the balance being Fe and inevitable impurities. The composition of the high-strength steel sheet may further contain one or more elements selected from, by mass, Cr: 0.3% or less, Mo: 0.3% or less, B: 0.005% or less, Cu: 0.3% or less, and Ni: 0.3% or less.

C: 0.02% or More and Less than 0.10%

Carbon (C) precipitates in the form of Nb carbides (the term "Nb carbides" used herein also refers to Nb carbonitrides) and increases the yield strength and tensile strength of the steel sheet by precipitation strengthening or limiting coarsening of ferrite grains. If the C content is less than 0.02%, the amount of Nb carbide precipitated is reduced and, as a result, the tensile strength targeted in the present disclosure may fail to be achieved. If the C content is 0.10% or more, the size of the Nb carbides is increased and, accordingly, the diameter of ferrite grains is increased. In addition, excessively large amounts of pearlite and martensite are formed. This reduces the yield ratio of the steel sheet to be less than 0.70. Accordingly, the C content is limited to 0.02% or more and less than 0.10% and is preferably 0.02% or more and 0.06% or less.

Si: Less than 0.10%

In general, silicon (Si) effectively increases the yield strength and tensile strength of the steel sheet by the solid-solution strengthening of ferrite. However, adding Si to the steel sheet significantly enhances strain hardenability and increases the tensile strength of the steel sheet by an amount larger than the increase in the yield strength of the steel sheet. This results in a reduction in the yield ratio and also degrades the quality of the surface of the steel sheet. Accordingly, the Si content is preferably reduced to a minimum level and, in the present disclosure, limited to be less than 0.10%. The Si content may be 0% in principle, but is commonly 0.001% or more in the industrial application.

Mn: Less than 1.0%

Adding manganese (Mn) to the steel sheet increases the yield strength and tensile strength of the steel sheet by the solid-solution strengthening of ferrite. If the Mn content is 1.0% or more, the difference in the temperature at which ferrite transformation starts subsequent to hot rolling between the Mn-rich portion and Mn-poor portion may occur as a result of casting segregation. This results in the difference in the temperature at which Nb carbides precipitate. As a result, the uniformity in the average diameter of ferrite crystal grains formed by annealing is degraded, and the difference in tensile strength between the center and edges of the steel sheet in the width direction exceeds 20 MPa. Accordingly, the Mn content is limited to be less than 1.0% and is preferably 0.2% or more and 0.8% or less.

P: 0.10% or Less

Adding phosphorus (P) to the steel sheet increases the yield strength and tensile strength of the steel sheet by the solid-solution strengthening of ferrite. However, if the P content exceeds 0.10%, the tensile strength of the steel sheet may be locally increased as a result of casting segregation or ferrite-intergranular segregation and, consequently, the difference in tensile strength between the center and edges of the steel sheet in the width direction is increased. Accordingly, the P content is limited to be 0.10% or less. The P content may be 0% in principle, but is preferably 0.01% or more and 0.04% or less.

S: 0.020% or Less

Sulfur (S) is an element inevitably contained in the composition of the steel sheet. When the steel sheet contains S, the amount of solute Mn is reduced as a result of the formation of MnS or the like. This reduces the yield strength and tensile strength of the steel sheet or increases the occurrence of cracking during press-forming by degrading the ductility of the steel sheet. Accordingly, the S content is preferably reduced to a minimum level. The upper limit of the S content is set to 0.020%. The S content is preferably preferably 0.015% or less. The S content may be 0% in principle, but is commonly 0.0001% or more in the industrial application.

Al: 0.01% or More and 0.10% or Less

Aluminum (Al) is used in the refining step in order to perform deoxidation and fix solute N in the form of AlN. The amount of Al required for achieving the above advantageous effects at a sufficient level is 0.01% or more. However, if the Al content exceeds 0.10%, the uniformity in the amount of AlN precipitated and the diameter of the AlN particles in the width direction of the steel sheet becomes degraded and, consequently, the difference in the average diameter of ferrite crystal grains between the center and edges of the steel sheet in the width direction is increased. Accordingly, the Al content is limited to be 0.01% or more and 0.10% or less, is preferably 0.01% or more and 0.07% or less, and is further preferably 0.06% or less.

N: 0.010% or Less

Nitrogen (N) is an element inevitably added to steel in the molten-iron-refining step or a step upstream of the molten-iron-refining step. If the N content exceeds 0.010%, coarse Nb carbide particles precipitate during casting. The Nb carbide particles do not dissolve in the following slab-heating treatment and increase the average size of ferrite crystal grains. Accordingly, the N content is limited to be 0.010% or less. The N content may be 0% in principle, but is commonly 0.0001% or more in the industrial application.

Nb: 0.005% or More and Less than 0.070%

Niobium (Nb) is an important element that increases the yield ratio of the steel sheet by reducing the average size of ferrite crystal grains and precipitating in the form of Nb carbides. The above advantageous effect may be degraded if the Nb content is less than 0.005%. If the Nb content is 0.070% or more, an excessively large amount of Nb carbide precipitates and unrecrystallized ferrite may remain even after annealing has been performed. This increases the difference in tensile strength between the center and edges of the steel sheet in the width direction. Accordingly, the Nb content is limited to be 0.005% or more and less than 0.070% and is preferably 0.010% or more and 0.040% or less.

The high-strength steel sheet according to the present disclosure may contain the following constituents as optional constituents.

Cr: 0.3% or Less

Chromium (Cr) may be added to the steel sheet as a trace element that does not impair the advantageous effects of the present disclosure. If the Cr content exceeds 0.3%, hardenability is enhanced and, consequently, an excessively large amount of martensite is formed. This may reduce the yield ratio of the steel sheet. Accordingly, when Cr is added to the steel sheet, the Cr content is limited to be 0.3% or less.

Mo: 0.3% or Less

Molybdenum (Mo) may be added to the steel sheet as a trace element that does not impair the advantageous effects of the present disclosure. If the Mo content exceeds 0.3%, hardenability is enhanced and, consequently, an excessively large amount of martensite is formed. This may reduce the yield ratio of the steel sheet. Accordingly, when Mo is added to the steel sheet, the Mo content is limited to be 0.3% or less.

B: 0.005% or Less

Boron (B) may be added to the steel sheet as a trace element that does not impair the advantageous effects of the present disclosure. If the B content exceeds 0.005%, hardenability is enhanced and, consequently, an excessively large amount of martensite is formed. This may reduce the yield ratio of the steel sheet. Accordingly, when B is added to the steel sheet, the B content is limited to be 0.005% or less.

Cu: 0.3% or Less

Copper (Cu) may be added to the steel sheet as a trace element that does not impair the advantageous effects of the present disclosure. If the Cu content exceeds 0.3%, hardenability is enhanced and, consequently, an excessively large amount of martensite is formed. This may reduce the yield ratio of the steel sheet. Accordingly, when Cu is added to the steel sheet, the Cu content is limited to be 0.3% or less.

Ni: 0.3% or Less

Nickel (Ni) may be added to the steel sheet as a trace element that does not impair the advantageous effects of the present disclosure. If the Ni content exceeds 0.3%, hardenability is enhanced and, consequently, an excessively large amount of martensite is formed. This may reduce the yield ratio of the steel sheet. Accordingly, when Ni is added to the steel sheet, the Ni content is limited to be 0.3% or less.

The balance of the composition which is other than the above-described constituents includes Fe and inevitable impurities. The steel sheet according to the present disclosure may also contain, in addition to the above-described constituents, elements such as Ti, V, Sn, Sb, Co, W, Ca, Na, and Mg, as inevitable impurities, in trace amounts such that the advantageous effects of the present disclosure are not impaired.

(2) Microstructure

The microstructure of the high-strength steel sheet according to the present disclosure includes, by area, ferrite: 90% or more, pearlite: 0% to 10%, and the total of martensite, retained austenite, and cementite: 0% to 3%. The average diameter of ferrite crystal grains $d_C$ at the center of the steel sheet in the width direction is 15.0 μm or less. The difference between the average diameter of ferrite crystal grains $d_E$ at a position 100 mm from an edge of the steel sheet in the width direction toward the center of the steel sheet and the average crystal grain diameter $d_C$ is 5.0 μm or less.

Ferrite: 90% or More

Ferrite, which has good ductility, is the main phase of the microstructure of the steel sheet according to the present disclosure. The ferrite content is 90% or more by area. If the ferrite content is less than 90% by area, a yield ratio of 0.70 or more may fail to be achieved. Accordingly, the ferrite content is limited to be 90% or more by area and is preferably 95% or more by area. The microstructure of the steel sheet according to the present disclosure may be composed of the ferrite phase only (the ferrite content may be 100% by area).

Pearlite: 0% to 10%

Pearlite is effective for achieving the desired yield strength and tensile strength. However, if the pearlite content exceeds 10% by area, a yield ratio of 0.70 or more may fail to be achieved. Accordingly, the pearlite content is limited to be 0% to 10% by area and is preferably 0% to 5% by area.

Total of Martensite, Retained Austenite, and Cementite: 0% to 3%

The microstructure of the high-strength steel sheet according to the present disclosure may include martensite, retained austenite, and cementite at a content of 0% to 3% in total, in addition to ferrite and pearlite. If the total content of martensite, retained austenite, and cementite exceeds 3%, a yield ratio of 0.70 or more may fail to be achieved. Accordingly, the total content of martensite, retained austenite, and cementite is limited to be 0% to 3% by area.

Average Diameter of Ferrite Crystal Grains $d_C$ at Center of Steel Sheet in Width Direction: 15.0 μm or Less The average diameter of ferrite crystal grains is important for achieving a high yield ratio of 0.70 or more, which is targeted in the present disclosure. If the average diameter of ferrite crystal grains exceeds 15.0 μm, a yield ratio of 0.70 or more may fail to be achieved. Accordingly, the average diameter of ferrite crystal grains at the center of the steel sheet in the width direction is limited to be 15.0 μm or less and is preferably 10.0 μm or less. Although the lower limit of the average diameter of ferrite crystal grains is not specified, the average diameter of ferrite grains is preferably 1.0 μm or more because, if the average diameter of ferrite crystal grains is less than 1.0 μm, the tensile strength and yield strength of the steel sheet may be excessively increased and, consequently, stretch flangeability and the elongation of the steel sheet may be degraded.

Difference Between Average Diameter of Ferrite Crystal Grains $d_E$ at Position 100 mm from Edge of Steel Sheet in Width Direction Toward Center of Steel Sheet and Average Crystal Grain Diameter $d_C$: 5.0 μm or Less The difference in the average diameter of ferrite crystal grains between the center and edges of the steel sheet in the width direction (the difference in the average diameter of ferrite crystal grains) is important for reducing the difference in tensile strength between the center and edges (position 100 mm from an edge of the steel sheet in the width direction toward the center of the steel sheet) of the steel sheet in the width direction to 20 MPa or less, which is targeted in the present disclosure. The difference is preferably reduced to a minimum level. If the difference in the average diameter of ferrite crystal grains between the center and edges of the steel sheet in the width direction exceeds 5.0 μm, the difference in tensile strength exceeds 20 MPa and the high-strength steel sheet targeted in the present disclosure may fail to be produced. Accordingly, the difference in the average diameter of ferrite crystal grains is limited to be 5.0 μm or less and is preferably 3.0 μm or less. Although the lower limit of the difference is not specified, the difference is preferably 1.0 μm or more, because reducing the difference to be less than 1.0 μm requires a large amount of capital investment for making the distribution of temperature of the steel sheet in the width direction uniform during hot rolling and annealing.

The area fraction of each microstructure is determined by a point-count method described in ASTM E 562-05 using the results of an SEM observation of a specific region of a thickness-direction cross section of the steel sheet which is taken so as to be perpendicular to the rolling-width direction, the specific range extending from a position ⅛ the thickness of the steel sheet from the surface of the steel sheet to a position ⅜ the thickness from the surface of the steel sheet with the center being a position ¼ the thickness from the surface of the steel sheet. The average diameter of ferrite crystal grains is determined by observing the specific region of the thickness-direction cross section of the steel sheet, which extends from a position ⅛ the thickness from the surface of the steel sheet to a position ⅜ the thickness from the surface of the steel sheet with the center being a position ¼ the thickness from the surface of the steel sheet, at the center and edges (position 100 mm from an edge of the steel sheet in the width direction toward the center of the steel sheet) of the steel sheet in the width direction with an SEM and then calculating the equivalent-circle diameter on the basis of the area observed and the number of the crystal grains.

The width of a coil of the steel sheet which is targeted in the present disclosure is 800 to 1700 mm.

(3) Production Conditions

The high-strength steel sheet according to the present disclosure is produced by preparing a steel having the above-described composition, casting the steel into a slab, hot-rolling the slab, cold-rolling the resulting hot-rolled steel sheet, and annealing the resulting cold-rolled steel sheet in a continuous annealing furnace. The hot-rolled steel sheet may optionally be pickled. The limitations on the production conditions are described below. The term "temperature" used in the following description refers to surface temperature.

The casting method is not limited. Any casting method such as an ingot-making method or a continuous casting method which does not cause a significant segregation of composition or nonuniformity in microstructure may be used.

In the hot-rolling step, a cast slab having a high temperature may be rolled directly or after the slab has been cooled to room temperature and subsequently reheated. In the case where defects such as cracks are present on the surface of the slab, the slab may be repaired using a grinder or the like. When the slab is reheated, the slab is preferably heated to 1100° C. or more in order to dissolve Nb carbides.

In the hot-rolling step, the slab is subjected to rough rolling and finish rolling. The resulting hot-rolled steel sheet is coiled to form a hot-rolled coil. The conditions under which rough rolling is performed in the hot-rolling step are not limited; rough rolling may be performed by a common method. The conditions under which finish rolling is performed are not limited; finish rolling may be performed by a common method. However, if finish rolling is terminated at a temperature lower than the Ar3 point, coarse ferrite grains elongated in the rolling direction may be formed, which degrade the ductility of the steel sheet. Accordingly, the finish-rolling temperature is preferably the Ar3 point or higher. The coiling temperature is important among the conditions under which the high-strength steel sheet according to the present disclosure is produced.

Coiling Temperature: 500° C. to 650° C.

The coiling temperature is a production condition important for controlling the diameter of ferrite grains formed by annealing to be 15.0 μm or less by adjusting the amount and diameter of Nb carbide precipitated. If the coiling temperature at the center of the steel sheet in the width direction is lower than 500° C., a sufficient amount of Nb carbide may fail to precipitate while cooling is performed subsequent to coiling and precipitation occurs in a relatively short time during heating and soaking performed in the annealing step. This increases a variation in the diameter of the precipitate particles, and the variation in the particle diameter increases the difference in tensile strength between the center and edges of the steel sheet in the width direction. If the coiling temperature exceeds 650° C., the diameter of Nb carbide precipitate is excessively increased and the average diameter of ferrite crystal grains is consequently increased. This results in failure to achieve a yield ratio of 0.70 or more. Accordingly, the coiling temperature is limited to be 50° C. to 650° C. and is preferably 550° C. to 630° C.

Difference in Temperature Between Center of Steel Sheet in Width Direction and Position 100 mm from Edge of Steel Sheet in Width Direction Toward Center of Steel Sheet During Coiling: 50° C. or Less The difference in temperature between the center and edges (position 100 mm from an edge of the steel sheet in the width direction toward the center of the steel sheet) of the steel sheet in the width direction during coiling (difference in the coiling temperature) is a production condition important for controlling the difference in the average diameter of ferrite crystal grains formed by annealing to be 5.0 µm or less by adjusting the amount and diameter of Nb carbide precipitate. The difference in the coiling temperature is preferably reduced to a minimum level. If the difference in the coiling temperature exceeds 50° C., the differences in the amount and diameter of Nb carbide precipitate become significant and the difference in the average diameter of ferrite crystal grains formed by annealing may exceed 5.0 µm. This may result in failure to produce a high-strength steel sheet having a reduced difference in tensile strength between the center and edges of the steel sheet in the width direction, which is targeted in the present disclosure. Accordingly, the difference in the coiling temperature is limited to be 50° C. or less and is preferably 30° C. or less. For reducing the difference in coiling temperature to 50° C. or less, portions in the vicinity of the edges of the steel sheet in the width direction may be heated with an edge heater. Alternatively, the amount of cooling may be adjusted by edge masking. The heating method is not limited; direct heating and induction heating may be employed. Although the lower limit of the difference in coiling temperature is not specified, the difference in coiling temperature is preferably 5° C. or more, because reducing the difference in coiling temperature to be less than 5° C. requires a large amount of capital investment for, for example, installing an additional edge heater in the immediate front of coiling.

The cold-rolling step may be conducted by a common method. The rolling reduction is preferably set to 30% to 80%.

After cold rolling has been performed, the resulting cold-rolled steel sheet is annealed in a continuous annealing furnace. Although the heating rate in the annealing step is not limited, heating is preferably performed at 0.1 to 30.0° C./s in consideration of production efficiency and capital investment. The heating method is not limited; a radiant tube method and a direct heating method may be employed. As for the conditions such as soaking temperature and soaking time, the soaking temperature is preferably 700° C. to 900° C., and the soaking time is preferably 1 second or more. Although the upper limit of the holding time (soaking time) is not specified, the holding time is preferably 300 seconds or less, because an excessively large amount of holding time results in the coarsening of Nb carbide particles.

The conditions under which cooling is performed subsequent to soaking are not limited. For example, the cooling-stop temperature is 400° C. to 50° C., the average cooling rate is 30° C./s or less, and the amount of time during which holding is performed in the temperature range of 400° C. to 500° C. is 10 to 100 seconds.

Coating may be performed on the surface of the high-strength steel sheet produced by the above-described method. The type of coating is preferably hot-dip galvanizing, in which the steel sheet is dipped into a hot-dip galvanizing bath.

The resulting hot-dip galvanizing layer may be subjected to an alloying treatment to form a galvannealed layer. In the case where the alloying treatment is performed, a holding temperature lower than 450° C. does not allow the hot-dip galvanizing layer to be sufficiently alloyed and, as a result, the adhesion of the coating layer and corrosion resistance may be degraded. On the other hand, if the holding temperature exceeds 560° C., the degree of alloying may be excessively increased and trouble such as powdering may occur during press forming. Accordingly, the holding temperature is preferably 450° C. to 560° C. The holding time is preferably 5 seconds or more, because a holding time less than 5 seconds does not allow the hot-dip galvanizing layer to be sufficiently alloyed and, consequently, the adhesion of the coating layer and corrosion resistance may be degraded.

Subsequently, temper rolling with an elongation of 0.1% to 5.0% may be performed as needed.

The high-strength steel sheet targeted in the present disclosure is produced in the above-described manner. In the case where a cold-rolled steel sheet is produced, electrogalvanizing or a surface treatment, such as a chemical conversion treatment or an organic coating treatment, may be further performed without impairing the characteristics of the steel sheet which are targeted in the present disclosure.

Examples

The present disclosure is described further in detail with reference to Examples below.

Steels A to M having the compositions shown in Table 1 were each prepared and casted into a slab. The slabs were cooled to room temperature and subsequently subjected to a slab-heating treatment, in which the slabs were soaked at 1250° C. for 1 hour. The slabs were subsequently hot-rolled with a finish-rolling temperature of 900° C. and a final thickness of 3.2 mm. The resulting hot-rolled steel sheets were coiled under a specific one of the sets of conditions shown in Table 2. The hot-rolled steel sheets were pickled and subsequently formed into cold-rolled steel sheets having a final thickness of 1.4 mm and a width of 1250 mm. The cold-rolled steel sheets were annealed under a specific one of the sets of conditions shown in Table 2. Hereby, the high-strength steel sheet Nos. 1 to 21 were prepared. In the case where coating was not performed, a CAL (continuous annealing line) was used for annealing. In the case where coating was performed, hot-dip galvanizing or a set of hot-dip galvanizing or galvannealing was performed using a CGL (continuous galvanizing/galvannealing line). In the case where the coating layer was formed into a galvannealed layer, an alloying treatment including holding at 510° C. for 10 seconds was performed.

The high-strength steel sheets were each inspected for microstructure and subjected to a tensile test.

The area fraction of each steel microstructure was determined by a point-count method described in ASTM E 562-05 using the results obtained by observing a specific region of a thickness-direction cross section of the steel sheet which was taken so as to be perpendicular to the rolling-width direction, the specific range extending from a position ⅛ the thickness of the steel sheet from the surface of the steel sheet to a position ⅜ the thickness from the surface of the steel sheet with the center being a position ¼ the thickness from the surface of the steel sheet, under a magnification of 1000 times with a SEM. The average diameter of ferrite crystal grains was determined by observing a specific region of a thickness-direction cross section of the steel sheet which was taken so as to be perpendicular to the rolling-width direction, the specific range extending from a position ⅛ the thickness from the surface of the steel sheet to a position ⅜ the thickness from the surface of the steel sheet with the center being a position ¼ the thickness from the surface of the steel sheet, at the center and edges (position 100 mm from an edge of the steel sheet in the width direction toward the center of the steel sheet) of the steel sheet in the width direction under a magnification of 1000 times with a SEM and then calculating the equivalent-circle diameter on the basis of the area observed and the number of the crystal grains. The above observations were each made in ten fields of view, and the average thereof was calculated. In Table 2, α denotes ferrite; P denotes pearlite; M denotes martensite; "α grain diameter" refers to the average diameter of ferrite crystal grains at the center of the steel sheet in the width direction; and "Difference in α grain diameter" refers to the difference in the average diameter of ferrite crystal grains between the center and edges of the steel sheet in the width direction.

The yield strength and tensile strength of the steel sheet were determined by taking a JIS No. 5 tensile test specimen from the steel sheet at a position at which the center of the parallel portion of the specimen coincided with the center of the steel sheet in the width direction or with a position 100 mm from an edge of the steel sheet in the width direction toward the center of the steel sheet such that the tensile direction of the specimen was perpendicular to the rolling direction and subjecting the specimen to a tensile test conforming to JIS Z 2241. A steel sheet having a tensile strength (TS) of 330 MPa or more and less than 500 MPa, a yield ratio (YR) of 0.70 or more, and the difference in tensile strength (TS difference) between the center and edges of the steel sheet in the width direction of 20 MPa or less was evaluated as being good. TS and YR shown in Table 2 are results of a tensile test conducted at the center of each steel sheet in the width direction.

TABLE 1 mass %

| Steel | C | Si | Mn | P | S | Al | N | Nb | Other | Category |
|---|---|---|---|---|---|---|---|---|---|---|
| A | 0.05 | 0.01 | 0.4 | 0.02 | 0.002 | 0.03 | 0.003 | 0.012 | | Example |
| B | 0.02 | 0.02 | 0.5 | 0.02 | 0.001 | 0.03 | 0.003 | 0.011 | | Example |
| C | 0.08 | 0.01 | 0.3 | 0.02 | 0.002 | 0.02 | 0.002 | 0.009 | | Example |
| D | 0.01 | 0.01 | 0.4 | 0.02 | 0.002 | 0.03 | 0.004 | 0.008 | | Comparative example |
| E | 0.12 | 0.03 | 0.5 | 0.01 | 0.003 | 0.04 | 0.003 | 0.011 | | Comparative example |
| F | 0.04 | 0.01 | 0.8 | 0.02 | 0.002 | 0.03 | 0.003 | 0.013 | | Example |
| G | 0.05 | 0.02 | 1.3 | 0.01 | 0.002 | 0.02 | 0.002 | 0.011 | | Comparative example |
| H | 0.04 | 0.01 | 0.5 | 0.02 | 0.003 | 0.03 | 0.004 | 0.007 | | Example |
| I | 0.04 | 0.01 | 0.6 | 0.02 | 0.002 | 0.04 | 0.003 | 0.038 | | Example |
| J | 0.05 | 0.02 | 0.5 | 0.02 | 0.002 | 0.02 | 0.004 | 0.002 | | Comparative example |
| K | 0.03 | 0.01 | 0.4 | 0.02 | 0.001 | 0.02 | 0.003 | 0.095 | | Comparative example |
| L | 0.08 | 0.02 | 0.3 | 0.01 | 0.002 | 0.03 | 0.003 | 0.015 | Cr: 0.1, Ni: 0.2, B: 0.0011 | Example |
| M | 0.07 | 0.02 | 0.5 | 0.03 | 0.002 | 0.02 | 0.003 | 0.013 | Cu: 0.1, Mo: 0.1 | Example |

*Underlined items are outside the range of of the present disclosure.

TABLE 2

| No. | Steel | Coiling temperature (° C.) | Difference in coiling temperature (° C.) | Annealing and coating ||||| Steel microstructure ||
|---|---|---|---|---|---|---|---|---|---|
| | | | | Soaking temperature (° C.) | Soaking time (s) | Coating | Alloying | α area fraction (%) | P area fraction (%) |
| 1 | A | 580 | 20 | 830 | 60 | Yes | No | 96 | 3 |
| 2 | B | 600 | 25 | 810 | 60 | No | No | 99 | 1 |
| 3 | C | 550 | 25 | 840 | 60 | Yes | Yes | 93 | 7 |
| 4 | D | 560 | 30 | 800 | 60 | No | No | 100 | 0 |
| 5 | E | 560 | 30 | 820 | 60 | Yes | No | 87 | 2 |
| 6 | F | 560 | 25 | 830 | 60 | Yes | Yes | 97 | 3 |
| 7 | G | 560 | 15 | 790 | 60 | Yes | Yes | 98 | 2 |
| 8 | H | 540 | 35 | 850 | 60 | No | No | 97 | 3 |
| 9 | I | 560 | 20 | 860 | 60 | No | No | 97 | 3 |
| 10 | J | 560 | 30 | 820 | 60 | Yes | Yes | 96 | 4 |
| 11 | K | 550 | 15 | 850 | 60 | No | No | 97 | 3 |
| 12 | L | 540 | 40 | 820 | 60 | Yes | Yes | 92 | 5 |
| 13 | M | 560 | 35 | 820 | 60 | Yes | No | 91 | 6 |
| 14 | A | 520 | 10 | 820 | 60 | No | No | 98 | 2 |
| 15 | A | 620 | 40 | 820 | 60 | Yes | Yes | 96 | 4 |
| 16 | A | 470 | 35 | 820 | 60 | No | No | 95 | 5 |
| 17 | A | 660 | 25 | 820 | 60 | Yes | No | 96 | 4 |
| 18 | A | 580 | 40 | 820 | 60 | No | No | 97 | 3 |
| 19 | A | 580 | 60 | 820 | 60 | Yes | No | 96 | 4 |
| 20 | F | 620 | 70 | 820 | 60 | Yes | No | 96 | 4 |

TABLE 2-continued

| | | | | | | | | | |
|---|---|---|---|---|---|---|---|---|---|
| 21 | L | 540 | <u>100</u> | 820 | 60 | Yes | No | 96 | 4 |

| | Steel microstructure | | | Mechanical properties | | | |
|---|---|---|---|---|---|---|---|
| | Balance | | Difference | | | | |
| No. | area fraction (%) | α grain diameter (μm) | in α grain diameter (μm) | TS (MPa) | YR | Difference in TS (MPa) | Category |
| 1 | M: 1 | 8.4 | 1.0 | 385 | 0.77 | 5 | Example |
| 2 | — | 9.0 | 2.0 | 361 | 0.78 | 11 | Example |
| 3 | — | 12.5 | 1.6 | 386 | 0.74 | 12 | Example |
| 4 | — | 10.6 | 2.2 | <u>289</u> | 0.72 | 16 | Comparative example |
| 5 | <u>M: 11</u> | <u>15.5</u> | 1.8 | <u>564</u> | <u>0.67</u> | 15 | Comparative example |
| 6 | — | 9.8 | 3.2 | 374 | 0.77 | 17 | Example |
| 7 | — | 8.2 | <u>5.5</u> | 358 | 0.81 | <u>29</u> | Comparative example |
| 8 | — | 11.6 | 2.4 | 345 | 0.71 | 14 | Example |
| 9 | — | 6.4 | 3.4 | 379 | 0.84 | 15 | Example |
| 10 | — | <u>16.6</u> | 2.6 | 382 | <u>0.63</u> | 13 | Comparative example |
| 11 | — | * | * | 385 | 0.88 | <u>27</u> | Comparative example |
| 12 | M: 3 | 7.6 | 2.4 | 411 | 0.72 | 9 | Example |
| 13 | M: 3 | 7.2 | 2.6 | 417 | 0.71 | 14 | Example |
| 14 | — | 7.8 | 3.4 | 412 | 0.79 | 16 | Example |
| 15 | — | 10.5 | 3.4 | 387 | 0.73 | 11 | Example |
| 16 | — | <u>16.5</u> | <u>6.2</u> | 425 | <u>0.67</u> | <u>26</u> | Comparative example |
| 17 | — | <u>15.8</u> | 3.0 | 376 | <u>0.65</u> | 10 | Comparative example |
| 18 | — | 10.2 | 2.6 | 399 | 0.78 | 16 | Example |
| 19 | — | 9.8 | <u>5.3</u> | 401 | 0.79 | <u>25</u> | Comparative example |
| 20 | — | 10.8 | <u>6.4</u> | 397 | 0.74 | <u>33</u> | Comparative example |
| 21 | — | 8.2 | <u>5.8</u> | 413 | 0.75 | <u>28</u> | Comparative example |

(Note 1):
Underlined items are outside the range at the present disclosure or an unfavorable property.
(Note 2):
* means unmeasurable because of the remaining unrecrystallized microstructure.

Table 2 shows the results of the observation of microstructure and the tensile test. The high-strength steel sheet Nos. 1 to 3, 6, 8 and 9, 12 to 15, and 18, which satisfied all the requirements of the present disclosure, were the high-strength steel sheets targeted in the present disclosure which have a high yield ratio and a reduced variation in tensile strength in the width direction of the steel sheet. In contrast, the high-strength steel sheet Nos. 4 and 5, 7, 10 and 11, 16 and 17, and 19 to 21, in which the steel composition or the production conditions were out of the range of the present disclosure, did not have the desired microstructure. That is, the high-strength steel sheet Nos. 4 and 5, 7, 10 and 11, 16 and 17, and 19 to 21 were not the high-strength steel sheets targeted in the present disclosure.

INDUSTRIAL APPLICABILITY

The high-strength steel sheet according to the present disclosure may be suitably used in an application that requires a high yield ratio, such as automotive sheet components.

The invention claimed is:
1. A high-strength steel sheet having a chemical composition comprising:
C: 0.02% or more and less than 0.10%, by mass %;
Si: less than 0.10%, by mass %;
Mn: less than 1.0%, by mass %;
P: 0.10% or less, by mass %;
S: 0.020% or less, by mass %;
Al: 0.01% or more and 0.10% or less, by mass %;
N: 0.010% or less, by mass %;
Nb: 0.005% or more and less than 0.070%, by mass %; and
Fe and inevitable impurities,
wherein:
the steel sheet has a microstructure including, by area:
ferrite: 90% or more,
pearlite: 0% to 10%, and
the total of martensite, retained austenite, and cementite: 0% to 3%,
an average crystal grain diameter $d_C$ of the ferrite at the center of the steel sheet in the width direction is 15.0 μm or less, and
a difference between an average crystal grain diameter $d_E$ of the ferrite at a position 100 mm from an edge of the steel sheet in the width direction toward the center of the steel sheet and the average crystal grain diameter $d_C$ is 5.0 μm or less.
2. The high-strength steel sheet according to claim 1, wherein the composition further comprises at least one of:
Cr: 0.3% or less, by mass %;
Mo: 0.3% or less, by mass %;

B: 0.005% or less, by mass %;
Cu: 0.3% or less, by mass %; and
Ni: 0.3% or less, by mass %.

3. The high-strength steel sheet according to claim 2, wherein a hot-dip galvanizing layer is disposed on a surface of the high-strength steel sheet.

4. The high-strength steel sheet according to claim 3, wherein the hot-dip galvanizing layer is a galvannealed layer.

5. The high-strength steel sheet according to claim 1, wherein a hot-dip galvanizing layer is disposed on a surface of the high-strength steel sheet.

6. The high-strength steel sheet according to claim 5, wherein the hot-dip galvanizing layer is a galvannealed layer.

7. The high-strength steel sheet according to claim 1, wherein the steel sheet has a tensile strength in the range of 330 MPa or more and less than 500 MPa.

8. The high-strength steel sheet according to claim 1, wherein the average crystal grain diameter $d_C$ is in the range of from 6.4 to 15.0 µm.

9. A method for producing the high-strength steel sheet according to claim 1, the method comprising:
  hot-rolling a slab having a chemical composition comprising:
    C: 0.02% or more and less than 0.10%, by mass %;
    Si: less than 0.10%, by mass %;
    Mn: less than 1.0%, by mass %;
    P: 0.10% or less, by mass %;
    S: 0.020% or less, by mass %;
    Al: 0.01% or more and 0.10% or less, by mass %;
    N: 0.010% or less, by mass %;
    Nb: 0.005% or more and less than 0.070%, by mass %; and
    Fe and inevitable impurities;
  coiling the resulting hot-rolled steel sheet such that a temperature of the hot-rolled steel sheet at the center of the steel sheet in the width direction is 500° C. to 650° C. and a difference between the temperature of the hot-rolled steel sheet at the center of the steel sheet in the width direction and a temperature of the hot-rolled steel sheet at the position 100 mm from an edge of the steel sheet in the width direction toward the center of the steel sheet in the width direction is 50° C. or less during coiling;
  cold-rolling the coiled hot-rolled steel sheet; and
  annealing the resulting cold-rolled steel sheet in a continuous annealing furnace,
  to produce the high-strength steel sheet according to claim 1.

10. The method for producing a high-strength steel sheet according to claim 9, wherein the method further comprises, subsequent to annealing, performing a hot-dip galvanizing on a surface of the high-strength steel sheet.

11. The method for producing a high-strength steel sheet according to claim 10, wherein the method further comprises subjecting the hot-dip galvanizing layer to an alloying treatment.

12. The method for producing a high-strength steel sheet according to claim 9, wherein the composition further comprises at least one of:
  Cr: 0.3% or less, by mass %;
  Mo: 0.3% or less, by mass %;
  B: 0.005% or less, by mass %;
  Cu: 0.3% or less, by mass %; and
  Ni: 0.3% or less, by mass %.

13. The method for producing a high-strength steel sheet according to claim 12, wherein the method further comprises, subsequent to annealing, performing a hot-dip galvanizing on a surface of the high-strength steel sheet.

14. The method for producing a high-strength steel sheet according to claim 13, wherein the method further comprises subjecting the hot-dip galvanizing layer to an alloying treatment.

* * * * *